(12) United States Patent
Cantu

(10) Patent No.: US 7,784,578 B2
(45) Date of Patent: Aug. 31, 2010

(54) VEHICLE SAFETY SYSTEM

(76) Inventor: Maria Dolores Cantu, 5991 Diamondback Dr., Brownsville, TX (US) 78526

(*) Notice: Subject to any disclaimer, the term of this patent is extended or adjusted under 35 U.S.C. 154(b) by 0 days.

(21) Appl. No.: 11/765,935

(22) Filed: Jun. 20, 2007

(65) Prior Publication Data

US 2007/0265753 A1   Nov. 15, 2007

Related U.S. Application Data

(63) Continuation-in-part of application No. 11/155,205, filed on Jun. 17, 2005, now Pat. No. 7,246,676.

(60) Provisional application No. 60/775,986, filed on Jul. 19, 2004.

(51) Int. Cl.
*B60R 21/00* (2006.01)
(52) U.S. Cl. .......................... 180/268; 292/92; 292/93; 701/45
(58) Field of Classification Search ................. 180/268, 180/274; 292/92, 93; 701/45
See application file for complete search history.

(56) References Cited

U.S. PATENT DOCUMENTS

| | | | |
|---|---|---|---|
| 3,194,582 A | 7/1965 | Kutz | |
| 4,162,715 A | 7/1979 | Coulombe | |
| 4,553,625 A * | 11/1985 | Tsuge et al. ................. | 180/268 |
| 5,011,215 A | 4/1991 | Kalina | |
| 5,094,501 A * | 3/1992 | Gersmann ................... | 296/155 |
| 5,165,498 A * | 11/1992 | Garboli et al. .............. | 180/268 |
| 5,497,641 A | 3/1996 | Linde et al. | |
| 5,556,140 A | 9/1996 | Sakagami | |
| 5,574,315 A | 11/1996 | Weber | |
| 5,655,619 A * | 8/1997 | Suran et al. .................. | 180/270 |
| 5,765,660 A | 6/1998 | Ambrosi | |
| 5,799,516 A | 9/1998 | Zintler | |
| 5,836,639 A | 11/1998 | Kleefeldt et al. | |
| 6,081,758 A | 6/2000 | Parvulescu | |
| 6,336,678 B1 | 1/2002 | Park | |
| 6,427,383 B1 | 8/2002 | Brooks et al. | |
| 6,428,049 B1 | 8/2002 | Nichols | |
| 6,601,905 B1 | 8/2003 | Klauzenberg et al. | |
| 6,738,167 B1 | 5/2004 | Suzuki | |
| 6,874,339 B2 | 4/2005 | Segawa | |
| 6,922,622 B2 * | 7/2005 | Dulin et al. ................... | 701/45 |
| 6,938,921 B2 * | 9/2005 | Fisher ..................... | 280/730.2 |
| 2002/0023797 A1 | 2/2002 | Baca | |
| 2002/0157313 A1 * | 10/2002 | Fukazawa et al. .............. | 49/26 |
| 2003/0160497 A1 | 8/2003 | Darr | |

* cited by examiner

*Primary Examiner*—Toan C To

(57) ABSTRACT

A safety system for a vehicle includes a window actuator connected to a window system of the vehicle for moving a window to an open position, a door lock actuator connected to a door lock system of the vehicle for moving the door lock system to the unlocked position, a seat belt actuator connected to a seat belt release connector for disengaging the release connector from a first connector of a seat belt system, a trunk system for opening a trunk compartment and a trigger in operational connection with the actuator(s). When the trigger is operated, the system is substantially simultaneously actuated moving the window to the open position, moving the door lock system to the unlocked position, disengaging the release connector from the first connector of the seat belt system, and/or opening part of the trunk system.

19 Claims, 6 Drawing Sheets

VEHICLE SAFETY SYSTEM

CROSS-REFERENCE TO RELATED APPLICATIONS

This application is a continuation-in-part of U.S. patent application Ser. No. 11/155,205, filed Jun. 17, 2005 now U.S. Pat. No. 7,246,676, which claims benefit of and priority to U.S. patent application Ser. No. 10/894,077 filed on Jul. 19, 2004, which was converted to U.S. provisional patent application Ser. No. 60/775,986 on Jul. 19, 2004.

FIELD OF THE INVENTION

Embodiments of the invention relate in general to vehicle safety systems and more specifically to a system for substantially simultaneously unlocking doors, opening windows, releasing the safety restraints and/or unlatching a trunk of a vehicle.

BACKGROUND

Increasingly motor vehicles include powered windows and locks. Further, as required by law in many locations, more and more vehicle occupants are wearing their seat belts. While these systems are convenient and provide safety during vehicle accidents, these same devices can create a safety hazard after accidents and in certain emergency situations. Situations occur all too often where a vehicle loses power making it difficult, if not impossible, to lower the windows or unlock the doors to allow the occupants to exit as soon as possible. Additionally, it may be difficult to release the seat belt. In some situations, such as in the case of fire or when the vehicle has encountered water, exit time is of the essence. In these situations the ability to simultaneously release the safety restraints and provide exit options increases the odds of survival and may reduce the extent of injuries.

SUMMARY OF THE INVENTION

Therefore, it is a desire to provide a vehicle safety system that reduces the time for an occupant to exit a vehicle.

It is a further desire to provide a vehicle safety system that operates after the vehicle has lost its primary electrical source.

It is a still further desire to provide a system compatible with vehicles that have either manually operated windows and door locks or powered windows and door locks.

It is a still further desire to provide a vehicle safety system that may be added to existing vehicle systems.

Accordingly, a safety system for a vehicle is provided that enables an operator to release the seat belt and/or open the window and/or unlock a door by operation of a single trigger even if the vehicle's primary electrical system is inactive. The system may include a single actuator connected to the window system, door lock system, and the seat belt system. The system may include more than one actuator connected to one or more of the vehicle operating systems.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
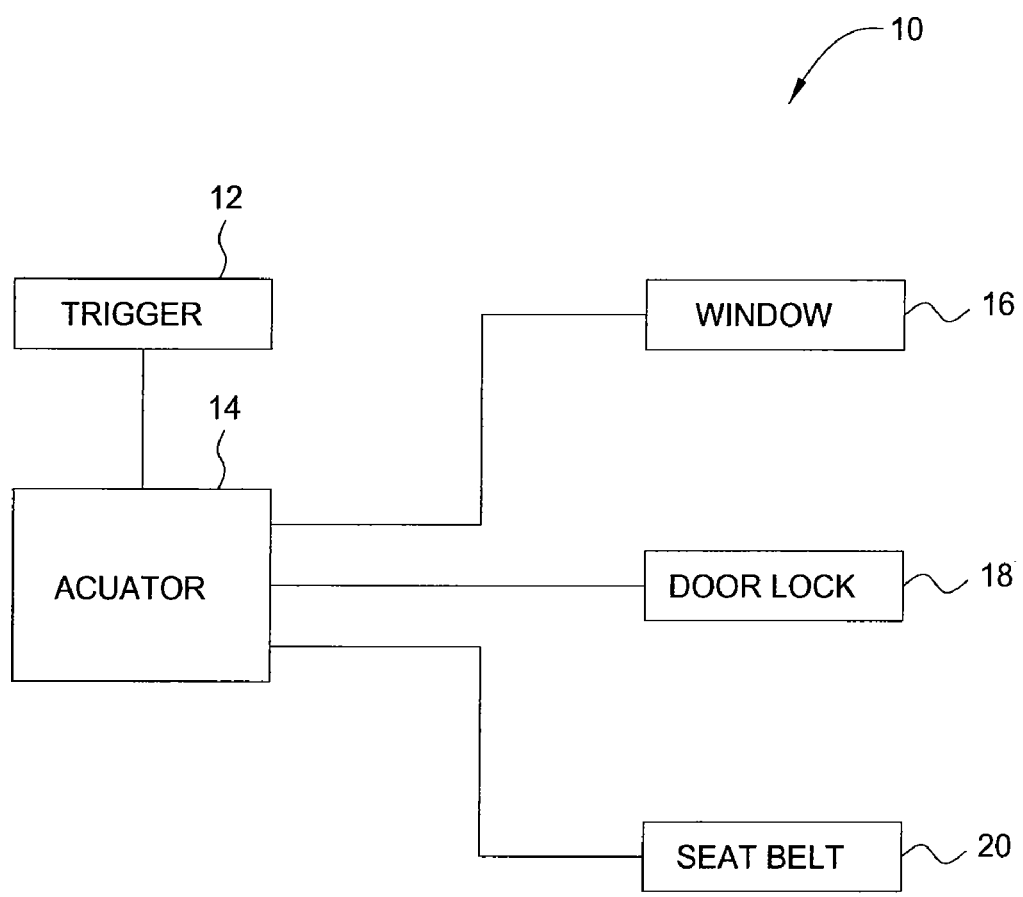
FIG. 1 is a diagram of an embodiment of the vehicle safety system of the present invention.

Refer now to the drawings wherein depicted elements are not necessarily shown to scale and wherein like or similar elements are designated by the same reference numeral through the several views.

FIG. 1 is a diagram of an embodiment of the vehicle safety system of the present invention, generally denoted by the numeral 10. Vehicle safety system 10 includes a trigger 12, actuator 14, moveable window system 16, door lock system 18, and seat belt system 20. Trigger 12 is functionally connected to actuator 14 for operating window system 16 from the closed to the open position, door lock system 18 from the locked to unlocked position, and seat belt system 20 from the latched to unlatched position. Trigger 12 is desirably positioned in the interior of the vehicle wherein it is accessible by the driver of the vehicle. However, it should be recognizable that trigger 12 may be positioned in various locations in the interior or exterior of the vehicle. Desirably, at least one secondary trigger 12 is positioned exterior of the vehicle's passenger compartment for access by emergency personnel when the occupants are incapacitated. It should be further recognized that trigger 12 may be operationally connected with one or more sensors, such as, but not limited to, smoke, fire, water and collision sensors for automatic operation upon sensing that an emergency situation has occurred.

Actuator 14 may be a single mechanism or system in functional connection with all of the operated systems or a separate actuator 14 may be operationally connected to one or more of the operated systems. Actuator 14 may include, but is not limited to, electric and hydraulic motors and manually, electrically, pneumatic and hydraulically controlled pistons. Pneumatic and hydraulic systems will be generally referred to herein as pressurized systems.

Figure 2:
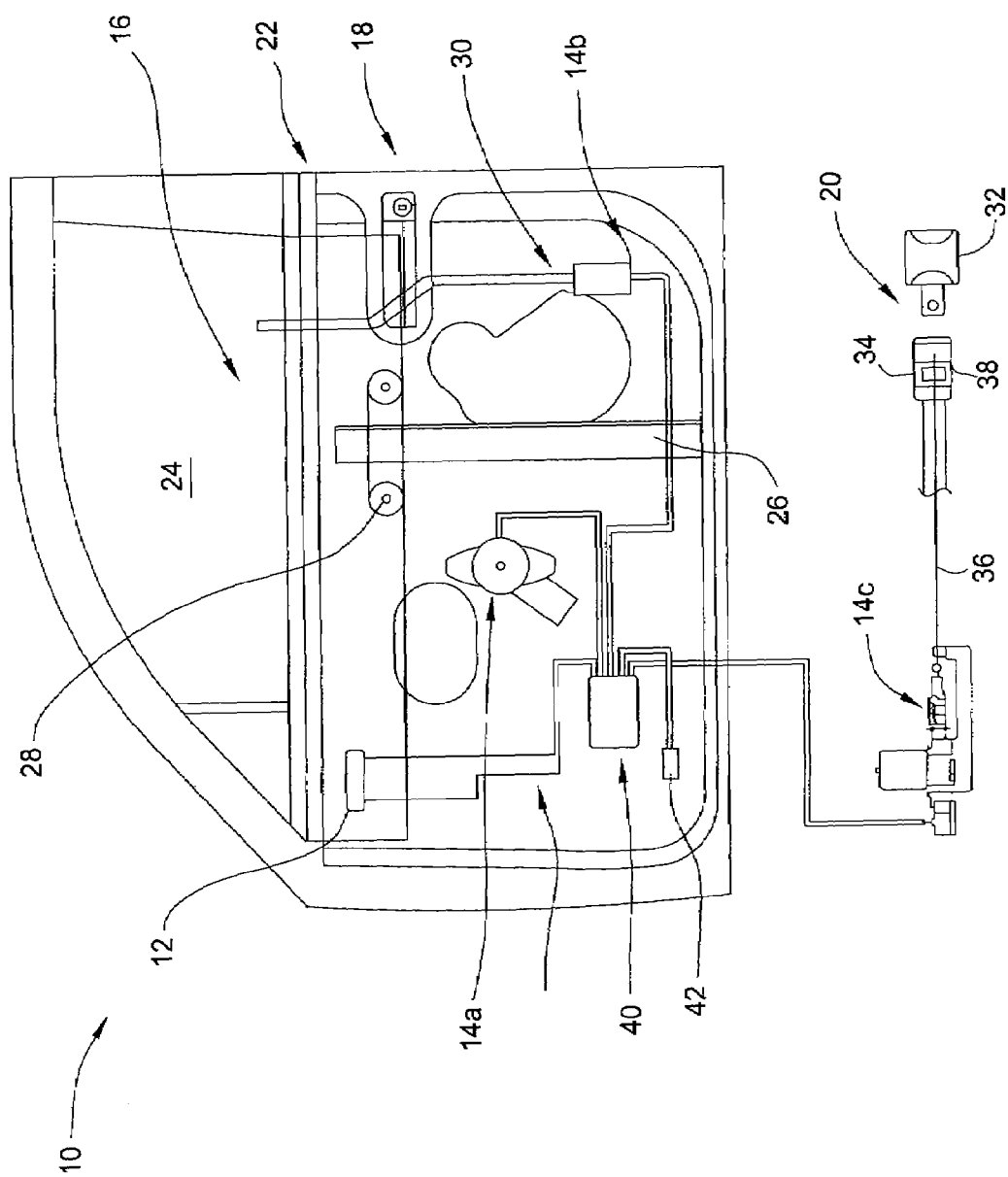
FIG. 2 is an illustration of an embodiment of an electrical vehicle safety system of the present invention.

FIG. 2 is an illustration of an embodiment of an electrical vehicle safety system 10 of the present invention in relation to a vehicle door 22. Actuator 14a is an electrical motor connected to window system 16. Window system 16 includes a window 24, window track 26, and pulleys 28. Actuator 14b is an electric motor connected to door lock system 18. Door lock system 18 includes a door lock linkage 30.

Seat belt system 20 includes a first connector 32 matable with a second belt release connector 34. Actuator 14c, a linear solenoid, is operationally connected to release connector 34 via a cable 36. Cable 36 has a first end 38 mechanically connected within release connector 34 such that when tension is applied release connector 34 releases first connector 32.

Trigger 12, an electrical switch, is electrically connected to actuators 14a, 14b, and 14c via a standby battery 40. Standby battery 40 is desirably rechargeably connected to the vehicle's primary battery or electrical system 42. In a preferred embodiment, standby battery 40 is encased in a watertight container to prevent shorting when the vehicle or the portion of the vehicle containing battery 40 is immersed in water.

Figure 3:
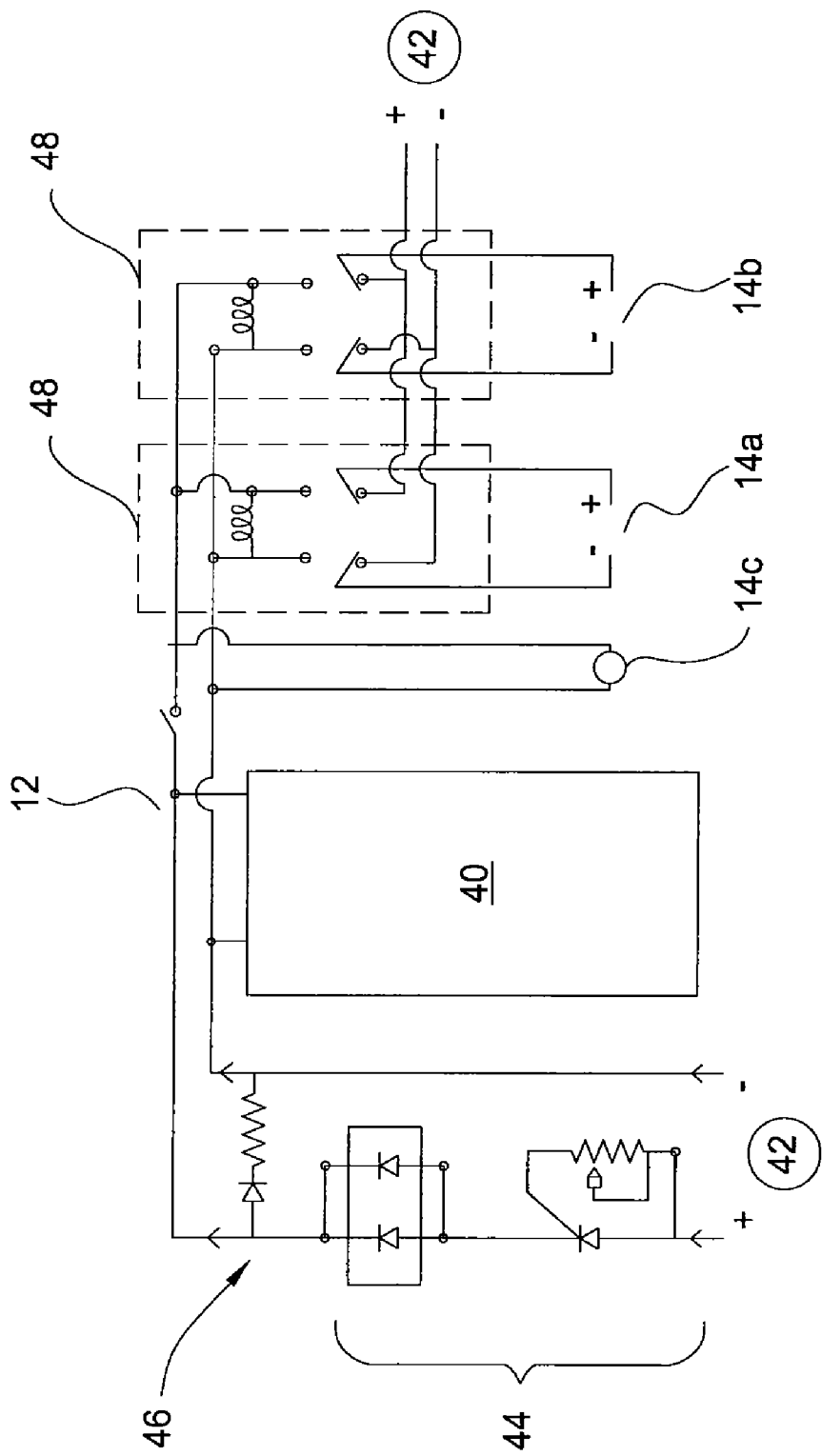
FIG. 3 is an electrical diagram of an embodiment of the vehicle safety system of FIG. 1.

FIG. 3 is an electrical diagram of vehicle safety system 10 of FIG. 1. Standby battery 40 is connected to primary electrical source 42 via a limit charger 44 to prevent overcharging of battery 40. Desirably a volt gauge 46 is connected for monitoring the status of battery 40. Battery 40 is operationally connected to actuators 14a, 14b, 14c via trigger 12 and relays 48. It may be desired for substantially all of the electrical components to water resistant.

Operation of vehicle safety system 10, as illustrated in FIGS. 1 and 2 is now described. Trigger or switch 12 is operated providing electricity to actuators 14a, 14b, and 14c. Upon actuation, actuator 14a operates window 24 to the open position. Actuator 14b operates door lock system 18 to the unlock position. Actuator 14c operates release connector 34, disconnecting first connector 32 from release connector 34. As can be seen, and with further reference to FIGS. 4 through 6, actuators 14a, 14b, and 14c may be replaced by a single actuator 14.

Figure 4:
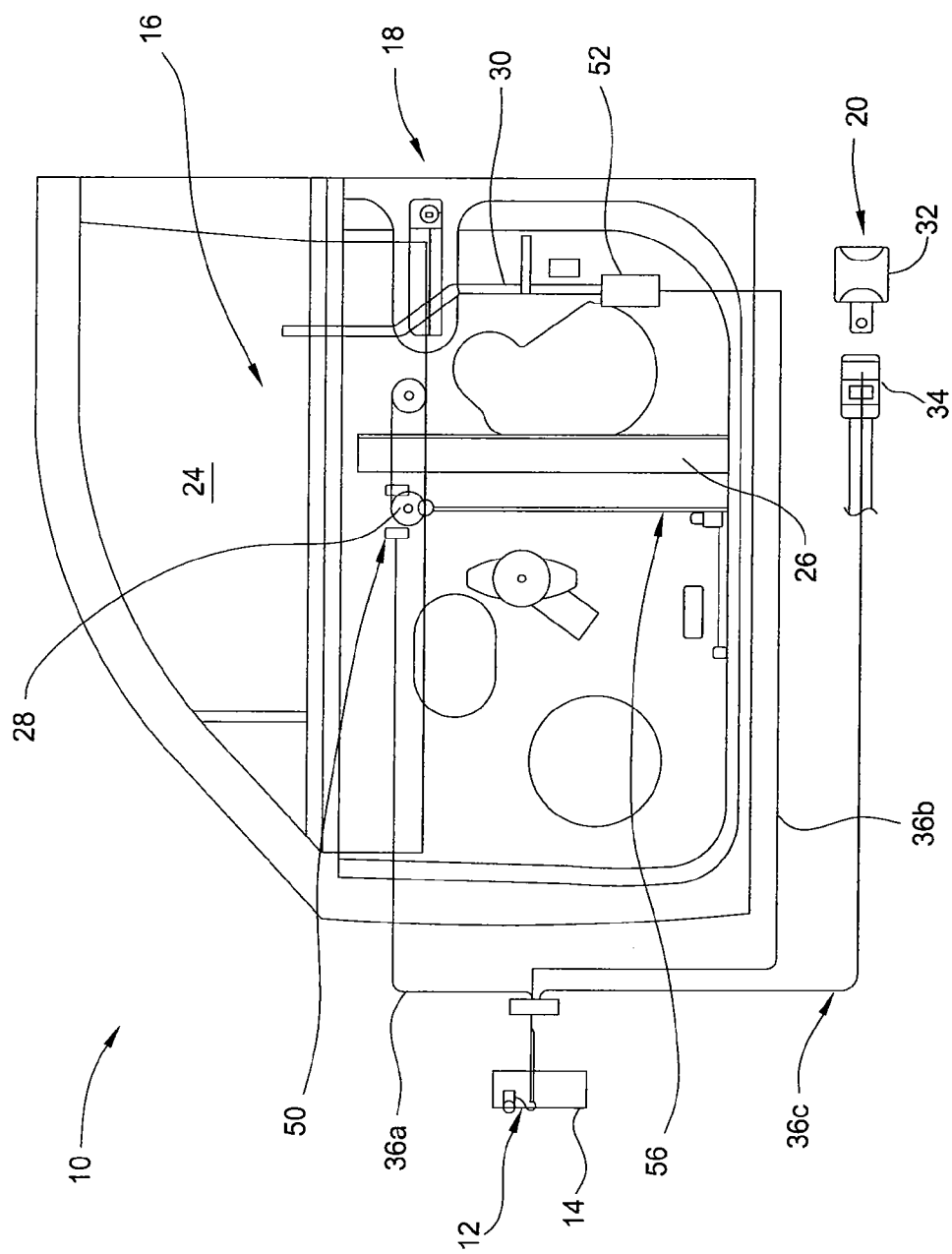
FIG. 4 is an illustration of another embodiment of a vehicle safety system of the present invention.

FIG. 4 is an illustration of another embodiment of vehicle safety system 10 of the present invention illustrating the use of a single actuator 14. Actuator 14 may be a linear piston or solenoid, operated manually, pneumatically, hydraulically, or electrically as described in relation to actuator 14c of FIGS. 1 and 2. The hydraulic or pneumatic embodiments would further include a fluid reservoir not shown. Trigger 12 is operationally connected to actuator 14 in a manner well known in the art. For example, if actuator 14 is electrically controlled, trigger 12 is a switch, if actuator 14 is manually operated, then trigger 12 may be a lever, and if actuator 14 is hydraulic or pneumatically operated, then trigger 12 may be a lever or button or other switch for injecting or releasing pressurized fluid in relation to actuator 14.

Actuator 14 is operationally connected to window system 16 by a cable 36a via window release 50. Actuator 14 applies a force via cable 36a to disengage window 24 from track 26. A biasing mechanism 56 such as, but not limited to, a spring may be connected to window 24, urging window 24 to the open position. Biasing mechanism 56 serves to move window 28 to the open position when the vehicle is upside down or at an angle wherein gravity will not move window 24 to the open position once it is disengaged from track 26.

Actuator 14 is operationally connected to door lock system 18 by cable 36b via lock release connector 52. Actuator 14 is connected to seat belt system 20 by cable 36c as described with reference to FIGS. 2 and 4.

Figure 5:
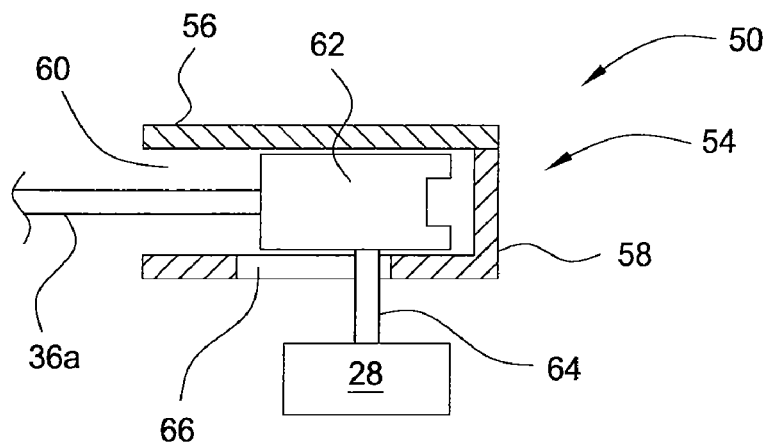
FIG. 5 is a cross-sectional view of an embodiment of the window release connector shown in FIG. 4.

FIG. 5 is a cross-sectional view of an embodiment of window release connector 50 illustrated in FIG. 4. Release connector 50 includes a housing 54 having a first section 56 and a second section 58. Housing 54 defines a chamber 60 moveably disposing a sliding member 62. A shaft 64 extends from sliding member 62 through a longitudinal slot 66 formed through a portion of second section 58 of housing 50. Shaft 64 is connected to a pulley 28 of window system 16 (FIG. 4). Cable 36a is connected to sliding member 62.

Figure 6:
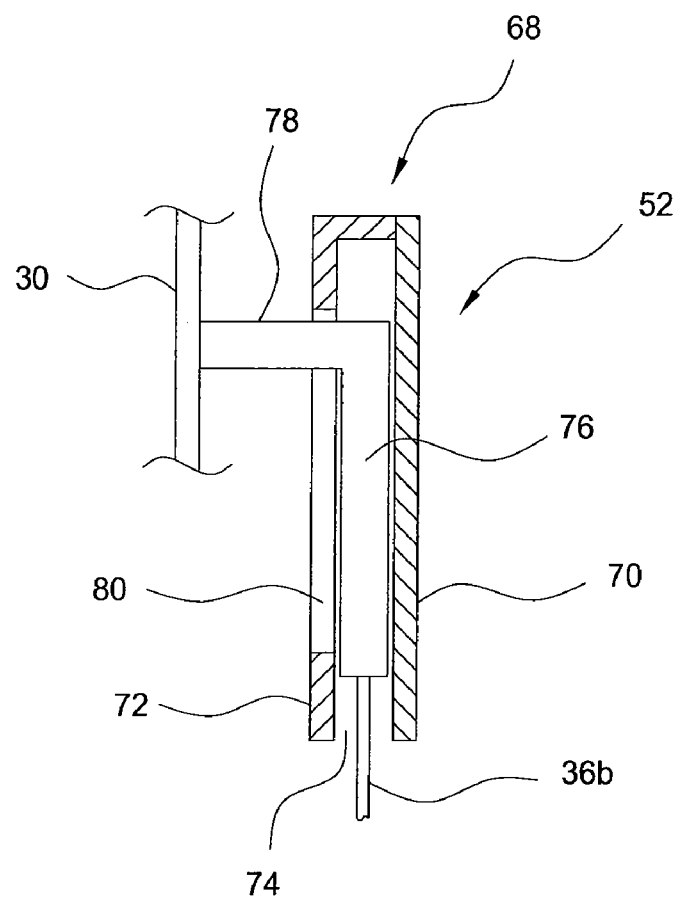
FIG. 6 is a cross-section view of an embodiment of the door lock release connector shown in FIG. 4.

FIG. 6 is a cross-section view of an embodiment of door lock release connector 52 shown in FIG. 4. Lock release connector 52 includes a housing 68 having a first section 70 and a second section 72 defining a chamber 74. A sliding member 76, having a shaft 78, is moveably disposed within chamber 74. Shaft 78 extends through a longitudinal slot 80 formed through second section 72 and is connected to door lock linkage 30 (FIG. 4).

Figure 7:
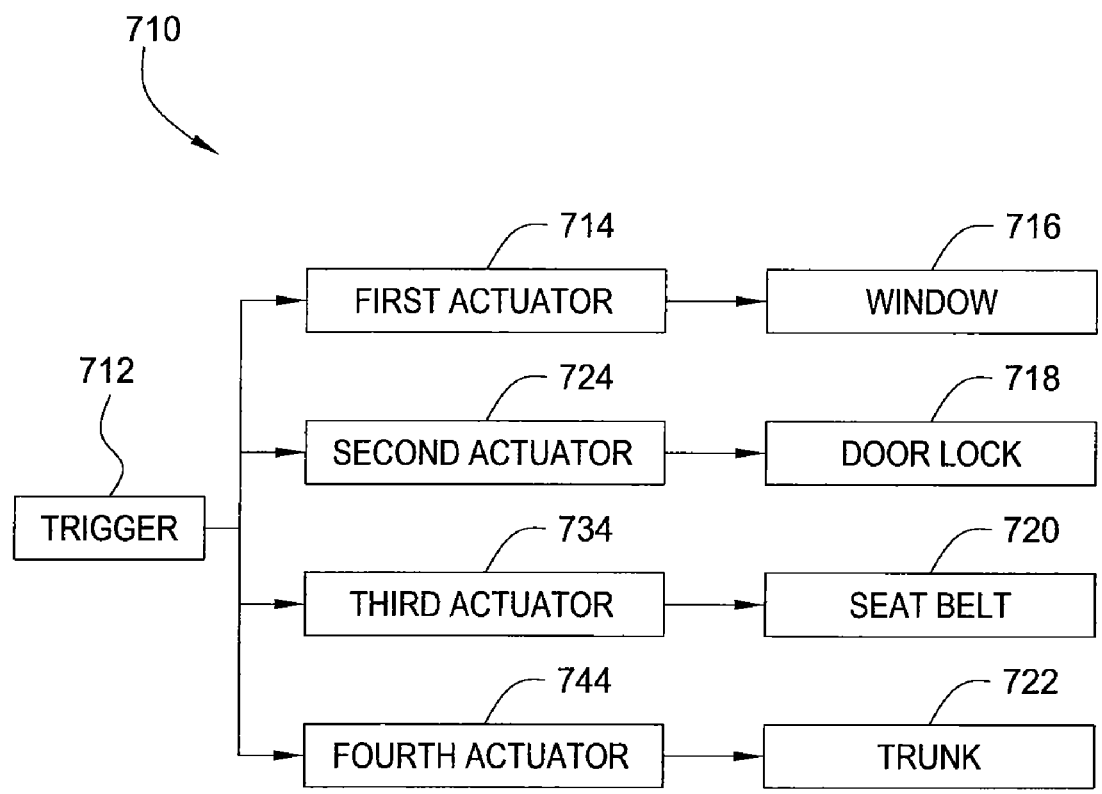
FIG. 7 is a diagram of an embodiment of another vehicle safety system of the present invention.

FIG. 7 shows an exemplary system 710 that includes a trunk release feature. As previously described herein, a trigger 712 sends signals to first, second and third actuators 714, 724, 734 for respective operation of window, door lock and seat belt systems 716, 718, 720. In addition, the trigger 712 may communicate a command to function a fourth actuator 744 coupled to a trunk system 722 of the vehicle. Upon receiving the command the fourth actuator 744 unlatches the trunk system 722 by releasing a lid of a trunk compartment or any other hatch at the rear of the vehicle. Any combination of features such as the standby battery 40, common actuator(s) and trigger arrangements described heretofore may be implemented with the system 710.

With reference to FIGS. 1 through 7 (for FIG. 7 like reference numbers include a 7 prefix), operation of vehicle safety system 10 of the present invention is described. The vehicle includes a window system 16, a door lock system 18, a seat belt system 20 and/or a trunk system 722. An actuator 14 is operationally connected to one or more of the window system 16, the door lock system 18, the seat belt system 20 and the trunk system 722. The trigger 12 is operationally connected to the actuator 14 such that when the trigger 12 is operated, the actuator 14 actuates, disengaging the window 24 from the track 26 freeing the window 24 to be moved to the open position by gravity and/or the biasing mechanism 56, operating the door lock system 18 to the unlocked position, operating the seat belt system 20 to the unlatched position by disengaging the first seat belt connector 32 from the release connector 34, and/or opening part of the trunk system 722. As illustrated, the system 10 may include a single actuator 14 connected to all of the operated systems or individual actuators for one or more operated system. The vehicle system 10 may include manual, electric, pneumatic, or hydraulic actuators 14 or a combination of actuators.

From the foregoing detailed description of specific embodiments of the invention, it should be apparent that a vehicle safety system that is novel and unobvious has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A safety system for a vehicle, the system comprising:
a power source;
a window actuator connected to a window system of the vehicle for moving a window to an open position;
a door lock actuator connected to a door lock system of the vehicle for moving the door lock system to an unlocked position;
a seat belt actuator connected to a seat belt system of the vehicle for disengaging the seat belt system to an unlatched position; and
a trigger in operational connection with the power source and the actuators, wherein when the trigger is operated, the actuators are actuated substantially simultaneously moving the window to the open position, moving the door lock system to the unlocked position, and disengaging the seat belt system to the unlatched position.

2. The system of claim 1, wherein the power source comprises a standby battery, the standby battery being secondary to a primary power supply for the vehicle.

3. The system of claim 2, wherein the standby battery is encased in a watertight container.

4. The system of claim 2, wherein the standby battery is rechargeably connected to the primary power supply for the vehicle.

5. The system of claim 1, further comprising a trunk actuator for unlatching a trunk of the vehicle.

6. The system of claim 1, wherein the trigger is located in an interior of the vehicle and is accessible to drivers of the vehicle.

7. The system of claim 6, further comprising a second trigger located on an exterior of the vehicle in operational connection with the power source and actuators, the second trigger being accessible to emergency personnel.

8. The system of claim 1, wherein the trigger is operationally connected with one or more sensors for automatic operation upon sensing an emergency situation.

9. The system of claim 8, wherein sensing the emergency situation comprises detecting one of smoke, fire, water, and collision.

10. The system of claim 1, wherein the actuators are powered by one or more of electricity, air pressure, and hydraulic pressure.

11. The system of claim 1, wherein the window system comprises a window and window track, wherein when the window actuator is actuated the window is disengaged from the window track in a manner such that the window is movable to the open position.

12. The system of claim 1, wherein the seat belt actuator is operationally connected to a release connector of a seatbelt engageable with a first connector for the seatbelt.

13. The system of claim 12, wherein the seat belt system comprises a cable that includes a first end mechanically connected within the release connector such that when tension is applied the cable releases the first connector.

14. A safety system for a vehicle, the system comprising:
   an actuator;
   a standby battery, wherein the standby battery is secondary to a primary power supply of the vehicle;
   a door lock linkage;
   a door lock release connector, wherein the door lock release connector further comprises a sliding member moveably disposed in a housing, the sliding member connected to the linkage by a shaft and to the actuator by a cable; and
   a manual trigger operationally connected to the actuator, wherein when the trigger is operated the actuator is actuated moving the system to an unlocked position.

15. The system of claim 14, further comprising a seat belt system that includes a second actuator and a second trigger operationally connected to the second actuator, wherein when the second trigger is operated the second actuator is actuated disengaging the seat belt system to an unlatched position.

16. The system of claim 14, further comprising a trunk actuator operationally connected to the trigger and for unlatching a trunk of the vehicle when the trigger is operated.

17. A safety system for a vehicle, the system comprising:
   an actuator operationally connected to a release connector of a seatbelt engageable with a first connector for the seatbelt, wherein the actuator is powered by one or more of electricity, air pressure, and hydraulic pressure;
   a cable that includes a first end mechanically connected within the release connector such that when tension is applied the cable releases the first connector; and
   a trigger operationally connected to the actuator, wherein the trigger is an electric switch and when the trigger is operated the actuator is actuated applying tension to the cable.

18. The system of claim 17, further comprising a trunk actuator operationally connected to the trigger and for unlatching a trunk of the vehicle when the trigger is operated.

19. The system of claim 17, wherein the system further comprises a door lock system operationally connected to the trigger, wherein when the trigger is operated the door lock system is moved to an unlocked position.

* * * * *